June 20, 1961 W. BAHMÜLLER 2,989,331
AUTOMATIC LOCKING DEVICE
Filed July 7, 1958
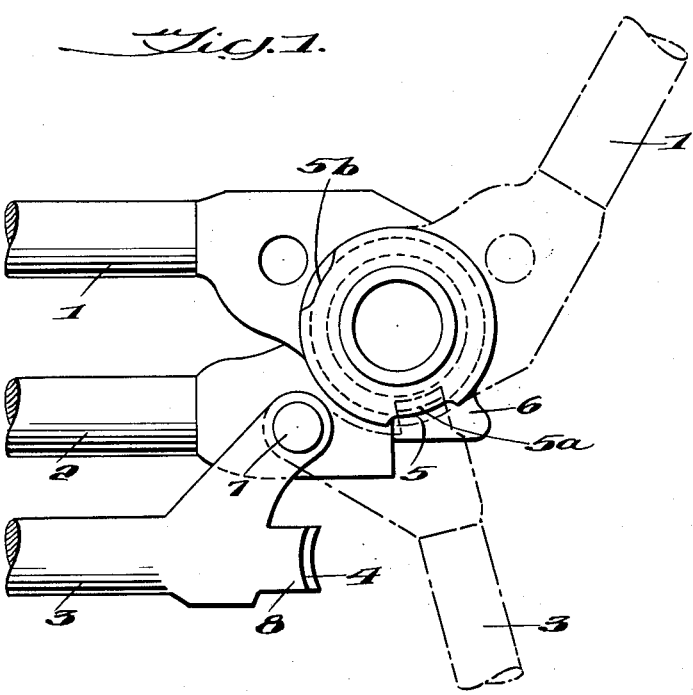
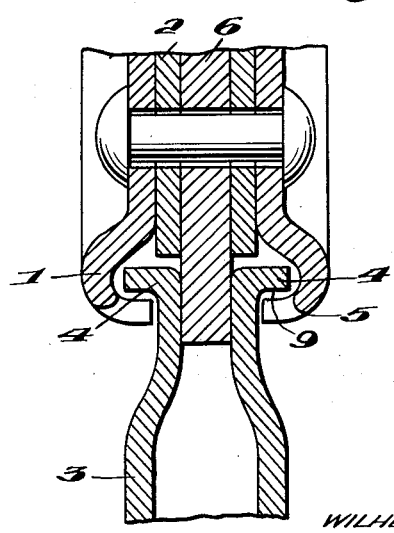
INVENTOR
WILHELM BAHMÜLLER,
BY Bailey, Stephens & Huettig
ATTORNEYS

United States Patent Office 2,989,331
Patented June 20, 1961

2,989,331
AUTOMATIC LOCKING DEVICE
Wilhelm Bahmüller, Im Sondle, Pluderhausen,
Wurttemberg, Germany
Filed July 7, 1958, Ser. No. 747,022
Claims priority, application Germany July 6, 1957
2 Claims. (Cl. 287—99)

The invention is concerned with an automatic locking device and more particularly with an automatic locking device serving to lock in their respective positions movable and displaceably adjustable parts linked to a fixed stationary part, such as back- or arm-rests, lids, covers, legs of chairs, beds, seats for automobile or aircraft bodies or the like. Such locking devices can be used also with couches, deck-chairs, loafers or similar pieces of furniture for camping purposes when these latter are provided with legs or back-rests linked to the stationary part of the couch or chair so as to be unfolded or folded up at will.

It is the main object of this invention to provide a device of the general character described which will automatically lock the movable part in its proper position to prevent it from folding up when it is unfolded.

Another object of the invention is to provide a device of the aforesaid kind which will lock the movable part in its proper position also on uneven ground and without the help of springs.

A further object of the invention is to provide a device of the abovedescribed character which is absolutely reliable in service, it being not at all necessary to fall back upon the customary special locking appliances such as indexing bolts, push buttons, fasteners or the like.

A still further object of the invention is to provide a locking device which is inexpensive, simple in construction, and effective in use, which takes little space, and which is applicable to pieces of furniture especially for camping purposes where two members or parts are movably connected together so as to permit unfolding into a spread relation or folding up into a collapsed relation.

With these and other objects in view, which will appear as the description proceeds, the invention consists of certain novel features of construction as will be particularly pointed out in the appended claims.

The manner of carrying the invention into effect is hereinafter described by way of example, reference being had to the accompanying drawings, in which:

FIG. 1 is a side view of a locking device according to the invention as used with couches and FIG. 2 is a sectional front view of the device of FIG. 1.

In FIG. 1 the parts of the device in their folded-up condition are shown in full lines, whereas the position of these parts in unfolded condition is shown in dotted lines. FIG. 2 shows the individual parts of the device when the back-rest is folded down and the legs are swung outwards so as to occupy their operative position.

In FIG. 1 the part of the device connected to the back-rest of a couch and hereinafter named for simplicity's sake shortly "back-rest" is designated as 1. 2 is a member connected to a fixed part of the couch and 3 is a part connected to a leg of the couch. For abbreviation, 2 is named hereinafter "fixed part," whereas 3 is named "leg." The leg 3 is pivoted to the fixed part 2 at 7, as can be seen in FIG. 1. A locking member 8 is connected to the leg 3 so as to move therewith, said locking member engaging, when the leg 3 is pivoted in anti-clockwise direction, into a locking element 5 fixed to the back-rest 1. When the back-rest is swung out, said locking element 5 locks the locking member 8. This latter has for this purpose two prongs 4 which, upon pivotal movement of the leg, penetrate into the hollowed out portion 9 of the locking element 5 and are held fast in their position within the said hollowed out portion 9 by means of corresponding counter-elements, when the back-rest and the locking element have been swung out in clockwise direction. It can be seen from the drawings that the locking member 8 branches off from the leg 3 at an acute angle and the prongs 4 on the free end of said member 8 are rectangularly bent outwards. In the embodiment shown in the drawings, the locking element 5 has, roughly, the shape of a hollow cylinder provided on its periphery with a recess or cut out portion of varying width, such width corresponding partly to that of the locking member and its projections taken together and partly to that of the locking member only. At 6 there is designated another locking element serving to fix the back-rest in its position with respect to the fixed or stationary part of the couch in a manner not shown here more in detail.

As can be seen from the drawings, the back-rest, the fixed or stationary part, and the leg extend in their folded up condition parallel and closely to one another. When the couch is to be erected and, therefore, the above described parts of the device have to be unfolded, the leg is swung outwards in anti-clockwise direction whereby the locking member 8 with its prongs 4 penetrates into the hollowed-out portion 9 of the locking member 5 which is still in position 5a. Thereafter, the back-rest is swung backwards in clockwise direction whereby the hollowed-out portion reaches the position 5b so that the prongs 4 are arrested in their position within the said hollowed-out portion 9. This locking of the member 8 takes place, therefore, automatically and without the aid of springs, it being effective also on uneven ground. Additional special locking appliances such as indexing bolts, push buttons, or fasteners or the like are not necessary anymore.

It is also possible to attach the locking member to the back-rest and the locking element to the legs of the couch or to connect the locking member or the locking element to the fixed or stationary part of the couch movably, for example, displaceably or turnably. In this latter case the corresponding member cooperating respectively with said locking member or said locking element is arranged on the movable part of the couch to be locked in its position. Obviously, this device can also be employed everywhere where displaceable parts pivoted to a fixed part must be fixed in their respective position, for example with lids, covers, or windows.

The hollowed-out portion 9 of the locking element 5 with the cut-out or recessed portion thereof can be designated as engaging means on said locking element, whereas the prongs 4 on said locking member 8 are the engaging means of this latter member. The edges of the part of said recess having a smaller width act as stop means for retaining the prongs 4 within the hollowed-out portion of said locking element and for locking the locking member 8 in its operating position. It can be seen, therefore, that the invention is concerned with an automatic locking device comprising a fixed stationary part, a locking element in connection with said fixed stationary part, said locking element being displaceable between an initial position and an operative position, engaging means on said displaceable locking element and displaceable therewith, stop means on said displaceable locking element and displaceable therewith, a movable part pivoted to said fixed stationary part in the vicinity of the place where connection is established between said fixed stationary part and said displaceable locking element, said movable part being movable between a rest position and an operative position, a locking member rigidly attached to said movable part so as to move therewith, engaging means on said locking member displaceable therewith and cooperating with said first named engaging means on said locking element, the arrangement being such that upon displacement of said movable part into its operative position said engaging means on said locking member engage into said engaging means on said locking element, whereby upon displacement of said displaceable locking element together with said engaging means and stop means thereon into their operative position said stop means lock said engaging means on said locking member in their respective engaging positions.

As can be seen from the drawings, said back-rest is an intermediate member pivotally connected, on the one hand, to said fixed stationary part and rigidly connected, on the other hand, to said displaceable locking element.

The device according to the invention can also be used with much facility in connection with deck-chairs or loafers for camping purposes.

The foregoing description is directed solely towards the construction illustrated, but I desire it to be understood that I reserve the privilege of resorting to all mechanical changes to which the device is susceptible, the invention being defined and limited only by the terms of the appended claims.

Having thus described the invention, what I claim as new and desire to secure by Letters Patent is:

1. A self-locking device comprising first, second and third parts, the second and third parts being pivoted on the first part to turn about parallel spaced axes, the second part being movable between operative and inoperative positions, the third part being movable between an inoperative position through a wide range to an operative position, said second part having a locking lug thereon extending therefrom in a direction substantially parallel to said axes and said third part having a flange composed substantially of a portion of a cylinder concentric with the pivot axis of the third part and engageable with said lug when the second part is in operative position and the third part is within said range to lock the second part with respect to the first part.

2. A self-locking device comprising first, second and third parts, the second and third parts being pivoted on the first part to turn about parallel spaced axes, the second part being movable between operative and inoperative positions, the third part being movable between an inoperative position through a wide range to an operative position, said second part having a locking lug thereon extending therefrom in a direction substantially parallel to said axes and said third part having a cylindrical flange concentric with the pivot axis of the third part and having a notch therein positioned, when the third part is in inoperative position, in the path of said lug when the second part moves to operative position, said flange, when the third part is moved towards operative position, engaging said lug throughout said range to lock the second part with respect to the first part.

References Cited in the file of this patent
UNITED STATES PATENTS

| | | |
|---|---|---|
| 816,853 | Eisele | Apr. 3, 1906 |
| 1,460,291 | Truffy | June 26, 1923 |
| 2,108,774 | Lipert | Feb. 15, 1938 |
| 2,410,088 | Lundquist | Oct. 29, 1946 |